United States Patent [19]
Pascouet

[11] Patent Number: 5,420,829
[45] Date of Patent: May 30, 1995

[54] METHOD AND APPARATUS FOR MODIFYING THE RECOIL OF A MARINE ACOUSTIC GENERATOR

[76] Inventor: Adrien P. Pascouet, 12014 Chatam La., Houston, Tex. 77024

[21] Appl. No.: 870,293

[22] Filed: Apr. 17, 1992

[51] Int. Cl.6 ............................................. H04R 23/00
[52] U.S. Cl. ................................. 367/144; 181/115; 181/120
[58] Field of Search ..................... 181/115, 118, 120; 367/144, 146

[56] References Cited

U.S. PATENT DOCUMENTS

| 3,379,273 | 4/1968 | Chelminski | 367/144 |
| 3,739,869 | 6/1973 | Mayne | 367/144 |
| 3,923,122 | 12/1975 | Itria | 181/115 |

*Primary Examiner*—J. Woodrow Eldred

[57] ABSTRACT

The present invention is directed to a method and apparatus for substantially suppressing the undesired recoil derivative from the explosive discharge of high pressure gas from an airgun while still providing for useful optimized pressure pulses.

8 Claims, 2 Drawing Sheets

METHOD AND APPARATUS FOR MODIFYING THE RECOIL OF A MARINE ACOUSTIC GENERATOR

BACKGROUND OF THE INVENTION

1. Field of the Invention

The present invention relates to high pressure air guns used in marine seismic exploration. More particularly, the present invention relates to a method and apparatus for substantially suppressing the undesired recoil derivative from the explosive discharge of high pressure gas from air guns while still providing for useful optimized pressure pulses.

2. Description of the Prior Art

In marine seismic exploration, a series of strong acoustical pulses or waves are generated in the water. These pulses rapidly pass through the water and the geological formation and are reflected at the surface for recording and interpretation. Though there exist a number of sources used in seismic exploration, the more popular seismic source is the air gun produced by companies such as Bolt, Inc. or Haliburton Geophysical Services, Inc. and improved seismic sources produced by Seismic Systems, Inc. such as those described in U.S. Pat. No. 5,018,115.

The air gun generally consists of an elongated annular housing defining a cylindrical chamber which is provided with a sealable port at one end and a shuttle valve which is slidably disposed along the chamber axis within or around said housing. When the shuttle is maintained in a first or "closed" position air is pressurized within the chamber by a sealable port defined thereby. When the shuttle is moved to a second or "open" position, the pressurized air is suddenly and explosively discharged into the water through one or more discharge portal(s) formed opposite the sealable port in the housing, which portal(s) communicate with the surrounding water.

When the pressurized gas is first released from the sealable port and is still confined within the chamber, the gas acquires a velocity parallel to the chamber walls, or a direction parallel to the axis defined by the chamber itself. In the vicinity of the sealable port, the cross-sectional flow area is at a minimum and the gas typically reaches a velocity approximating the speed of sound, or approximately 340 meters per second at standard temperature. This portion of the chamber is commonly referred to as the throat. At the throat, the gas molecules, having acquired a velocity close to that of sound and a flow direction paralleling the axis of chamber, will tend to follow a flow line as close as possible to chamber axis. The precise flow line of the pressurized gas depends on the geometry of the chamber, the geometry of the sealable port, obstacles encountered on the natural flow path of the gas molecules as well as the interaction between parallel flow lines of the gas molecules.

When the gas molecules reach the end of the housing opposite the sealable port, they vary from their flow direction parallel the chamber axis as they impact the distal end of the housing (or of the shuttle valve depending on the architecture of the air gun) and are forced outwardly through the discharge portal(s). While it might appear as though the gas molecules would then adopt a direction perpendicular to the axis of the chamber, the gas molecules instead adopt flow lines which on average define an acute angle of some 45°-60° with the axis defined by the chamber. The momentum carried by the mass of the gas flowing into the water with the aforedescribed high velocity creates a directional vector which tends to move the air gun axially in a direction opposite the vectored flow lines of the gas, thereby inducing a recoil.

In operation, the air gun is typically towed behind a specially equipped surface vessel whereupon the gun is actuated at selected, closely spaced intervals. When used in such a fashion, the air gun is tethered to the surface vessel by a heavy gauge cable or harness to which is coupled electrical cable to actuate the air gun, and high pressure air lines to supply pressurized gas to the gun. The air lines are coupled to large compressors on-board the marine vessel.

The aforedescribed axial movement of the housing induced by the discharge of gases at repetition frequencies in the nature of every ten seconds, frequently causes considerable wear and fatigue on the harness, electrical cables and high pressure air lines. For obvious reasons, this wear is undesirable and necessitates frequent repair and replacement of these components with incident costs associated with down-time of the air gun and support equipment.

A variety of apparatus have been proposed to counter the aforedescribed and undesired effects resultant from the recoil of the air gun. One such solution is that proposed in European Patent Application No. 0355954. In this proposed design, the air gun is attached to a solid block or frame of substantial mass in an effort to minimize the recoil of the air gun during operation. This design, however, is undesirable since the frame is heavy, cumbersome and quite expensive.

In seismic exploration, it is desired to create a large primary pulse, which is useful is seismic exploration, while reducing secondary, pulses which distort the acoustic signature of the primary pulse, and therefore reduce the quality of the portrayal of the marine geological formation. As is well known in the art, the primary pulse is created by the initial discharge of pressurized gas. This gas quickly expands to form a bubble. The collapse and reexpansion of this bubble creates the secondary pulse. The elimination or reduction of the secondary pulse has been the subject of considerable study and research.

To maximize the signature of the primary acoustic pulse, air guns are frequently used in clusters. In the cluster, two or more air guns are coupled together in sufficient proximity that the high pressure gas discharges from each gun coalesce and thus achieve a greater primary pulse then that achievable using a single gun. In a "clustered" mode, however, the undesired recoil effects described above are exacerbated. This is discussed in U.K. Patent No. 2176605A as well as in an article entitled "Air Gun Interdependency Pursuit of the Spectral Limits" by John C. Write & Dewey R. Young as published in the SEG Annual Meeting in 1988.

Further, in the air gun cluster, the spacing between the air guns is highly dependent upon the depth at which the cluster is fired and the air pressure supplied to each air gun. When the air guns are situated in a block or frame in an effort to minimize their recoil, a change in the firing depth or air pressure of the cluster necessitates a corrected spacing of the guns in the frame. This respacing is both cumbersome and time consuming, and, consequently, results in enhanced costs.

SUMMARY OF THE INVENTION

The present invention addresses the above and other disadvantages of prior art techniques and apparatus by providing a method and apparatus to suppress or reduce the recoil of an air gun by modifying the flow angle taken by the gas as it exists the gun. Consequently, the present invention, unlike the prior art, addresses the problem of undesirable recoil instead of merely attempting to remedy the effects of the recoil.

The apparatus of the present invention is directed to a deflector which is formed or situated at one end of the air gun housing proximate the discharge portal and opposite the sealable port. In one preferred embodiment, this deflector serves to change or modify the direction of the mean flow line of the gas molecules to a direction perpendicular to the axis of the air gun housing. If, as in the usual case, the discharge portals are situated in a symmetrical fashion in the air gun housing, the deflector of the present invention will substantially reduce or eliminate any axial movement of the air gun relative to the water during firing.

In a second embodiment, the deflector may be designed so as to impart a small axial component to the air gun in a direction opposite the direction the air gun is towed through the water. In such a fashion, the frictional drag effects resultant from towing the air gun or air gun array through the water may be mitigated.

The method of the present invention contemplates deflecting the vectored discharge of a conventional air gun to substantially reduce or eliminate any axial movement of the gun during firing, or alternatively, to produce a desired axial component.

The present invention has a number of advantages over the art. One advantage is the substantial reduction or elimination of the axial movement of a conventional air gun during subsurface operation. In such a fashion, wear on air lines, electrical lines and the like may be substantially reduced. Similarly, when such guns are used in a cluster, the use of cumbersome blocks or frames may be eliminated.

A second advantage is the ability of the method and apparatus of the present invention to produce a desired axial component which may be useful in reducing the drag produced by the air gun during towing.

DETAILED DESCRIPTION OF THE PREFERRED EMBODIMENT

Figure 1:
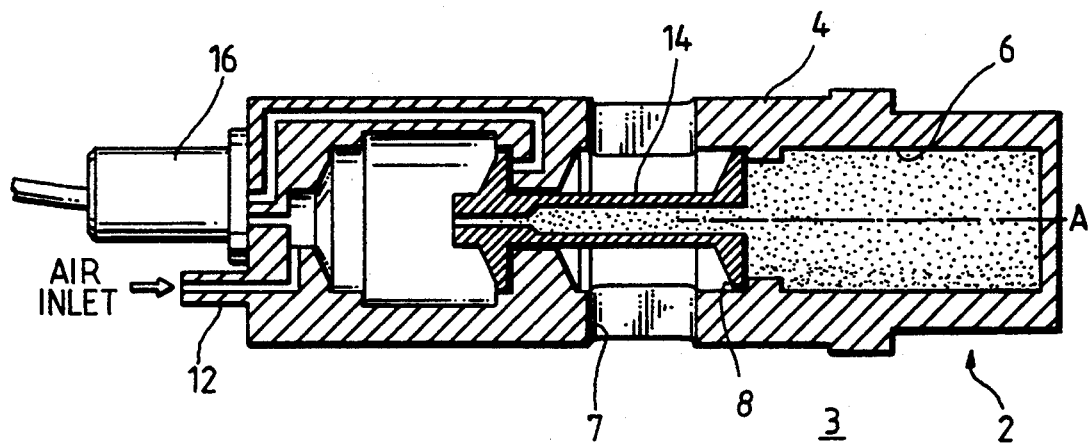
FIG. 1 illustrates a cross-section of a typical air gun in a pre-fired orientation.
Figure 2:
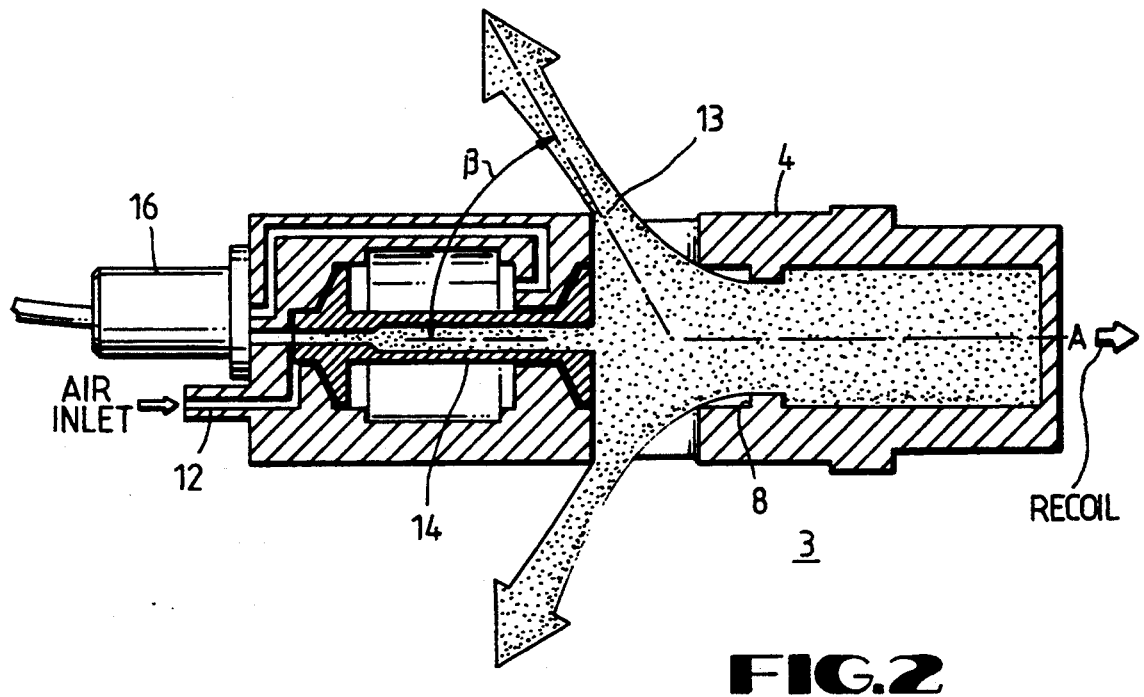
FIG. 2 illustrates the vectored flow of gas discharged from the air gun of FIG. 1 without the deflector of the present invention.

FIG. 1 illustrates a typical air gun 2, e.g. the air gun described in U.S. Pat. No. 3,379,273, in a "prefired" orientation. As illustrated, air gun 2 comprises an elongate annular housing 4 defining a chamber 6 having a sealable port 8 and a series of discharge portals 10. Gas derived through air inlet 12 is held and pressurized within sealable port 8 via a shuttle 14 which is slidably disposed within said housing 4. When the air gun is actuated via solenoid 16, shuttle 14 moves rapidly from a sealing position as illustrated in FIG. 1 to a "firing" or discharge position as illustrated in FIG. 2. When fired, pressurized gas contained within sealable port 8 is discharged through discharge portals 10 into the surrounding water 3.

The above described action of firing the air gun takes a fraction of a millisecond. The repressurization of the air gun however takes somewhat longer. Accordingly, the repetition frequency of such an air gun is typically in the order of some ten seconds.

Since it is desirable to produce a large primary pulse for purposes of seismic exploration, the volume of pressurized gas, usually air, released with each firing cycle may be quite large, e.g. in the order of 500 cubic inches. Similarly, the air gun, to enhance the acoustic signature of the primary pulse, is generally highly pressurized in the order of 2,000 psi (138 bar) or more.

As described above, the pressurized gas volume immediately upon release maintains a flow line or direction generally parallel to the axis "A" defined by air gun housing 4. When the gas volume reaches the distal end 7 of housing 4 opposite sealable port 8, the discharged gas is forced outwardly through discharge portals 10. Ideally, this gas, upon release through portal 10, would describe an angle of 90° with axis A. In actuality, however, for most air guns the angle of the flow line described by the gas when it exits housing 4 is in the order of some 45°-60° as measured from chamber axis "A".

The momentum carried by the mass of high pressure gas released at high velocity creates an opposite momentum in the air gun which is equal to the axial component of the gas along axis "A". Based upon the typical flow vector of 45°-60°, the momentum of the air gun equals the momentum of the gas multiplied by $\cos\beta$, where $\cos\beta$ has the value between 0.5 and 0.7.

The significance of these values may be described by example. In an air gun having a volume of 330 cubic inches or 5.2 liters and a pressure of 2,000 psi or 138 bar, the total mass of the gas at normal temperatures is some 0.806 kgm. If the gas is discharged from the air gun chamber at the velocity of sound, where c=340 m/sec at normal temperature, the total momentum of the gas exiting the gun will be in the order of 0.806 kgm×340 m/sec=274 kgm×m/sec. The mass of a typical air gun having a volume of 300 cubic inches is approximately 70 kgm. Using this value, with a 60° angle between the mean flow line and axis "A", produces a recoil with a velocity in the order of 2 m/sec. Chamber 6 typically depressurizes in the order of approximately 5 milliseconds. Accordingly, the average force exerted by the gas in the air gun is in the order of 27,400 Newtons or some 2.74 tons. This recoil force, repeated at an average frequency of every ten seconds, is detrimental to the wear life of the harness and electrical and air lines as described above.

Figure 3:
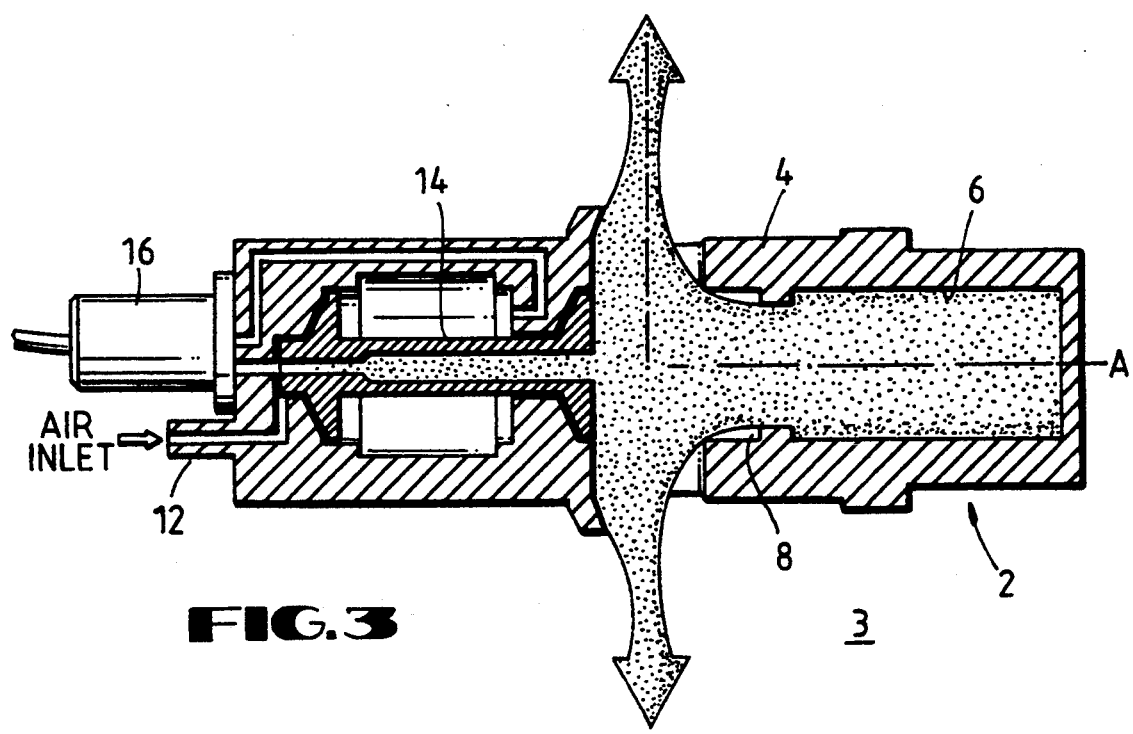
FIG. 3 illustrates the flow of gas discharged from the air gun of FIG. 1 incorporating the deflector of the present invention.
Figure 4:
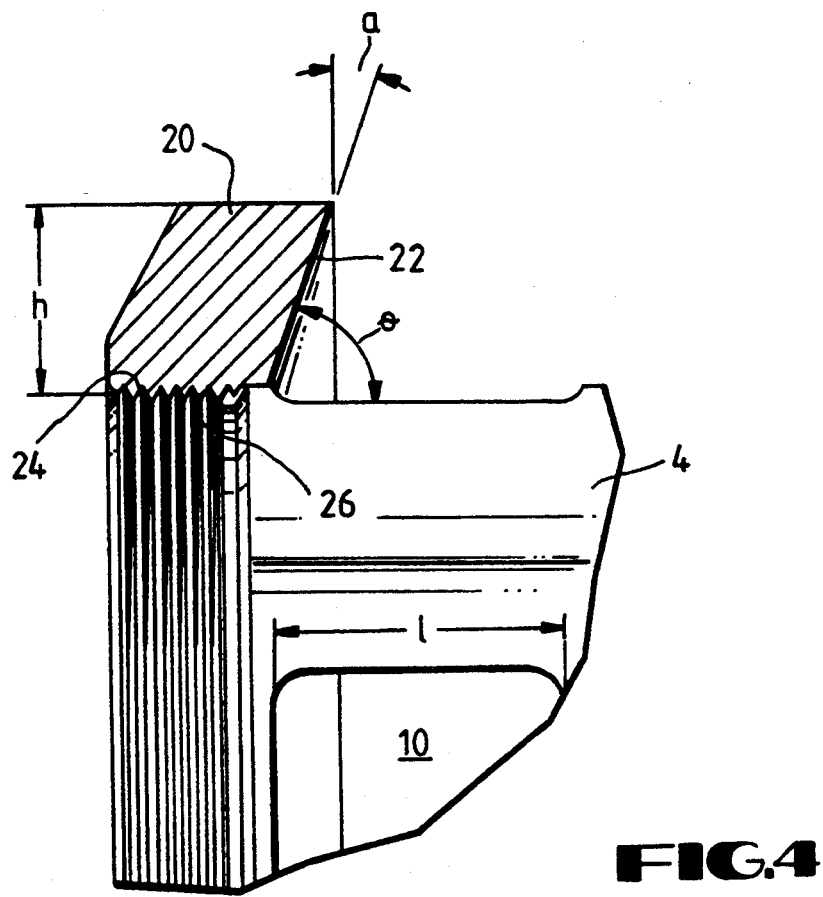
FIG. 4 illustrates a detailed, cross-section of one embodiment of the deflector of the present invention illustrating the angle of deflection relative to the axis defined by the air gun chamber.

Referring to FIGS. 3 and 4, the apparatus of the present invention generally comprises a deflector which may be added to existing air guns as an after-market improvement or which may be formed integrally with an air gun housing 4 (or a shuttle 14, again depending on the architecture of the air gun). By reference to the embodiment illustrated in FIG. 4, the deflector of the present invention comprises a ring 20 which is secured to the housing 4 immediately proximate the discharge portals 10 and opposite the sealable port 8 (See FIG. 3). To aid in coupling ring 20 to the housing 4, ring-like structure 20 preferably defines an inner diameter closely approximating the outer diameter of housing 4. Ring 20 may be provided with an interior thread 26 receivable to a complementary thread 24 formed on the exterior of housing 4. Other means of attachment are also envisioned within the spirit of the present invention. In this connection, ring 20 may be bolted or welded to housing 4 by conventional techniques.

Forming ring 20 separately from the air gun housing 4 (or shuttle 14) is desirable if an after market adaptation or upgrade of a preexisting air gun source is contemplated. Alternatively, however, the deflector may be manufactured integrally with housing 4 in a one piece set-up.

Ring 20 preferably describes a conical cross section, where the contact face 22 of said ring is oriented immediately opposite discharge portals 14 so that contact face 22 interacts with the pressurized gas discharge in a fashion illustrated in FIGS. 3 and 4. In a preferred embodiment, face 22 is planar in configuration and describes an angle of inclination $\Theta$ with the axis "A". In other embodiments, face 22 may define an arcuate or concave shape.

It has been discovered that the angle of inclination $\Theta$ is desirably that angle which may be derived by adding the vector angle $\beta$ of the gas discharge exiting the air gun as measured from axis "A" to 90°. Accordingly, if the vectored, acute angle $\beta$ for the gas discharge as exhibited in FIG. 2 is 60°, angle $\Theta$ is preferably in the order of 150°, if a perpendicular discharge having little or no axial component is desired.

The cross sectional height "h" of ring 20 is determined by evaluating the geometry of both the air gun chamber 6 and discharge portals 10. It has been found that the value h=0.61 where l=length of portal along axis "A" is an average value for the height.

When the deflector of the present invention is incorporated into an air gun, the momentum generated by the gas discharged through portals 10 has a substantially reduced axial component. This is because the vectored flow lines of the gas discharge, upon interfacing with face 22 of ring 20, adopt a substantially perpendicular orientation with respect to axis "A". When the axial component is thus reduced, the recoil resultant from operation of the air gun is minimized or eliminated.

In some instances, however, it may be desirable to minimize or reorient the axial recoil component without eliminating it completely. Referring to FIGS. 1-3, the air gun is most often used in a towed array behind a specially designed vessel. In such cases, the air gun is towed in a direction from right to left as viewed in the FIGS. 1-3. Absent deflection of the gas discharge in accordance with one embodiment of the present invention, the axial component of the recoil would add in a cumulative fashion to the frictional drag component observed by towing the air gun array through the water. If the axial component of the gas discharge is eliminated as described above, this cumulative effect, which enlarges the force necessary to tow the air gun array at a constant speed, is reduced or eliminated.

The drag component itself, however, may also be reduced if an opposite axial component can be introduced. This may be achieved by deflecting the gas discharge beyond the perpendicular in a direction opposite the direction of tow. In such a fashion, the stress on the towing harness may be further reduced and towing facilitated.

I claim:

1. An apparatus for minimizing the axial recoil component of gas discharged incident to the operation of an airgun, where said airgun comprises a housing, an elongate chamber formed in said housing and defining an axis "A" a sealable port, and at least one discharge portals through which high pressure gas released from said sealable port is discharged into the water at an angle B defined with respect to said axis "A", comprising:

A deflector having a contact face and an attachment site, said deflector being securely coupled to said airgun housing via said attachment site such that said contact face is situated immediately proximate said discharge portals and opposite said sealable port such that gas discharged from said sealable port physically interacts with said contact face, the angle of inclination $\Theta$ of said contact face with respect to said axis substantially equals the sum $90° + \beta$.

2. The apparatus of claim 1 wherein said contact face is disposed substantially perpendicular to said flow of discharged gas.

3. The apparatus of claim 1 wherein said deflector comprises a ring having an inner and an outer diameter, where said inner diameter closely approximates the outer diameter of said air gun housing.

4. The apparatus of claim 3 where said inner diameter of said ring is threadably receivable to threads formed on the exterior said housing.

5. The apparatus of claim 1 where said housing is made of stainless steel.

6. A recoilless airgun to generate a series of pressure pulses into a body of water by abruptly releasing a charge of high pressure gas within said body of water, comprising:

an elongate housing having a cylindrical chamber therein defining an axis "A" where said chamber is provided with one sealable port and said housing is provided with at least one discharge portals at one end;

a shuttle slidably disposed in said housing between a first and a second position, said shuttle in said first position sealing said sealable port, said port containing therein a quantity of high pressure gas, said shuttle when moved from said first to said second position abruptly releasing said gas into the water through said discharge portal(s), where said gas discharge has both an axial and a radial component with respect to said axis "A";

means to modify the axial component of said gas discharge to reduce the axial movement of said airgun incident the actuation of said airgun.

7. The air gun of claim 6 wherein the gas discharge defines an acute angle $\beta$ with the axis "A" where further said modification means includes a plate situated immediately proximate the discharge portal and opposite said sealable port such that said plate is inclined with respect to said axis "A" at an angle of inclination $\Theta$, where $\Theta = (90° + \beta)$.

8. A method for minimizing the axial recoil of an airgun having a housing, a chamber, and at least one discharge portals, where said chamber defines an axis "A" and where pressurized gas discharged from said portals defines an angel B with respect to said axis "A", the method comprising deflecting the pressurized gas exiting said discharge portals by a plate inclined at an angle $\Theta$ with respect to said axis where $\Theta$ is substantially $(90° + \beta)$.

* * * * *